(12) United States Patent
Schechter et al.

(10) Patent No.: US 8,918,836 B2
(45) Date of Patent: Dec. 23, 2014

(54) PREDICTING NEXT CHARACTERS IN PASSWORD GENERATION

(75) Inventors: Stuart Edward Schechter, Kirkland, WA (US); Cormac Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/453,966

(22) Filed: Apr. 23, 2012

(65) Prior Publication Data

US 2013/0283337 A1 Oct. 24, 2013

(51) Int. Cl.
*G06F 21/00* (2013.01)
*G06F 21/46* (2013.01)

(52) U.S. Cl.
CPC ..................................... *G06F 21/46* (2013.01)
USPC .................... 726/1; 726/4; 713/183

(58) Field of Classification Search
CPC ....................................................... G06F 21/46
USPC ........................................... 726/1, 4; 713/183
See application file for complete search history.

(56) References Cited

U.S. PATENT DOCUMENTS

| | | | |
|---|---|---|---|
| 6,532,214 B1 | 3/2003 | Rumsewicz | |
| 7,299,359 B2 * | 11/2007 | Hurley | 713/182 |
| 7,367,053 B2 * | 4/2008 | Sanai et al. | 726/6 |
| 7,443,316 B2 * | 10/2008 | Lim | 341/22 |
| 7,523,499 B2 | 4/2009 | Wilkins et al. | |
| 7,934,101 B2 * | 4/2011 | Stieglitz et al. | 713/183 |
| 8,108,932 B2 * | 1/2012 | Himberger et al. | 726/25 |
| 8,332,918 B2 * | 12/2012 | Vedula et al. | 726/6 |
| 8,386,238 B2 * | 2/2013 | Spataro | 704/9 |
| 8,555,357 B1 | 10/2013 | Gauvin | |
| 8,769,607 B1 * | 7/2014 | Jerdonek et al. | 726/1 |
| 2005/0114678 A1 | 5/2005 | Bagga et al. | |
| 2007/0006301 A1 * | 1/2007 | Nickell et al. | 726/22 |
| 2008/0172715 A1 | 7/2008 | Geiger et al. | |
| 2008/0216170 A1 * | 9/2008 | Sanai et al. | 726/18 |
| 2008/0307235 A1 * | 12/2008 | Keohane et al. | 713/183 |
| 2009/0024555 A1 | 1/2009 | Rieck et al. | |
| 2009/0150971 A1 | 6/2009 | Vedula et al. | |
| 2009/0158406 A1 * | 6/2009 | Jancula et al. | 726/5 |
| 2009/0172788 A1 | 7/2009 | Vedula et al. | |
| 2009/0241196 A1 | 9/2009 | Troyansky et al. | |
| 2009/0265559 A1 | 10/2009 | Hwang | |
| 2010/0138443 A1 | 6/2010 | Ramakrishnan et al. | |
| 2010/0318903 A1 * | 12/2010 | Ferren | 715/259 |

(Continued)

OTHER PUBLICATIONS

Password Strength Prediction using Supervised Machine Learning Techniques; MS Vijaya et al.; 2009 International Conference on Advances in Computing, Control, and Telecommunication Technologies; 2009; IEEE.*

(Continued)

*Primary Examiner* — Bradley Holder
*Assistant Examiner* — James Turchen
(74) *Attorney, Agent, or Firm* — Judy Yee; Steve Wight; Micky Minhas

(57) ABSTRACT

A current prefix character string representing a prefix of a proposed password may be obtained from a user input device. A prediction of a most likely next character of the proposed password may be determined, based on applying a set of heuristics to the current prefix character string. A response indicating an impact on a security strength of the proposed password may be determined, based on a selection of the predicted most likely next character.

20 Claims, 12 Drawing Sheets

(56) References Cited

U.S. PATENT DOCUMENTS

| | | | | |
|---|---|---|---|---|
| 2011/0083172 | A1* | 4/2011 | Heim et al. | 726/6 |
| 2011/0314294 | A1* | 12/2011 | McGrew et al. | 713/182 |
| 2012/0110668 | A1* | 5/2012 | Schechter et al. | 726/25 |
| 2014/0189826 | A1* | 7/2014 | Vedula et al. | 726/6 |

OTHER PUBLICATIONS

Password Strength: An Empirical Analysis; Matteo Dell'Amico et al.; 2010; IEEE.*

"Shannon Entropy," Retrieved Apr. 23, 2012 at <<http://www.ueltschi.org/teaching/chapShannon.pdf>>, 8 pages.

Schechter et al., "Popularity is Everything: A New Approach to Protecting Passwords from Statistical-guessing Attacks," Retrieved Mar. 15, 2012 at <<http://research.microsoft.com/pubs/132859/popularityISeverything.pdf>>, In the 5th USENIX Workshop on Hot Topics in Security (HotSec '10), USENIX, Aug. 10, 2010, 6 pages.

"Fastwords," Retrieved Feb. 27, 2012 at http://www.fastword.me>>, 5 pages.

Jakobsson, M., et al., "Rethinking Passwords to Adapt to Constrained Keyboards," Retrieved Feb. 27, 2012 at <<http://www.fastword.me>>, 11 pages.

"Test Your Password Strength to Prevent Hacking", Retrieved Feb. 22, 2012 at <<http://techlogon.com/2011/11/23/test-your-password-strength-to-prevent-hacking/>>, (Nov. 2011), 2 pages.

Song, D.X., et al., "Timing Analysis of Keystrokes and Timing Attacks on SSH", Retrieved Feb. 22, 2012 at <<http://www.cs.berkeley.edu/~daw/papers/ssh-use01.pdf>>, Proceedings of the 10th conference on USENIX Security Symposium (SSYM'01) (2001), 16 pages.

Siddharth, "Build a Simple Password Strength Checker", Retrieved Feb. 22, 2012 at <<http://net.tutsplus.com/tutorials/javascript-ajax/build-a-simple-password-strength-checker/>>, Nov. 4, 2009, 10 pages.

Jamuna, et al., "A Novel Approach for Password Strength Analysis through Support Vector Machine", Retrieved Feb. 22, 2012 at <<http://ijrte.academypublisher.com/vol02/no01/ijrte02017982.pdf>>, International Journal of Recent Trends in Engineering, vol. 2, No. 1 (Nov. 2009), pp. 79-82.

Seenu, Srinivas, "Visual Hashing: Confirm that You have not Mistyped the Password", Retrieved Feb. 22, 2012 at <<http://www.thegeeksclub.com/visual-hashing-confirm-mistyped-password>>, Jan. 1, 2012, 3 pages.

Provos, et al., "A Future-Adaptable Password Scheme," retrieved at <<http://www.usenix.org/events/usenix99/provos/provos.pdf>>, Proceedings of the FREENIX Track: 1999 USENIX Annual Technical Conference, Jun. 1999, 13 pages.

Weir, Charles Matthew, "Using Probabilistic Techniques to Aid in Password Cracking Attacks," retrieved at <<http://etd.lib.fsu.edu/theses/available/etd-04142010-194235/unrestricted/Weir_C_Dissertation_2010.pdf>>, Dissertation, Florida State University, 2010, 139 pages.

Ullrich, Johannes, "Some Thoughts About Passwords," retrieved at <<http://blogs.sans.org/appsecstreetfighter/2010/08/17/thoughts-passwords/>>, the SANS Institute, Aug. 17, 2010, 3 pages.

Chazelle, et al., "The Bloomier Filter: An Efficient Data Structure for Static Support Lookup Tables," retrieved at <<http://www.eecs.harvard.edu/~michaelm/CS222/bloomier.pdf>>, Proceedings of the Fifteenth Annual ACM-SIAM Symposium on Discrete Algorithms, Jan. 2004, 10 pages.

Porat, Ely, "An Optimal Bloom Filter Replacement Based on Matrix Solving," retrieved at <<http://arxiv.org/PS_cache/arxiv/pdf/0804/0804.1845v1.pdf>>, Proceedings of the Fourth International Computer Science Symposium in Russia on Computer Science—Theory and Applications, Aug. 2009, 13 pages.

Zetter, Kim, "Weak Password Brings 'Happiness' to Twitter Hacker," retrieved at <<http://blog.wired.com/27bstroke6/2009/01/professed-twitt.html>>, Wired.com, Jan. 6, 2009, 5 pages.

Adams, et al., "Users Are Not the Enemy," retrieved at <<http://citeseerx.ist.psu.edu/viewdoc/download;jsessionid=AAC3D572D9E2A3B7E4EF4E8CB3694002?doi=10.1.1.23.6790&rep=rep1&type=pdf>>, Communications of the ACM, vol. 42, No. 12, Dec. 1999, pp. 40-46.

Bawa, et al., "Privacy-Preserving Indexing of Documents on the Network," retrieved at <<http://ftp.almaden.ibm.com/cs/projects/iis/hdb/Publications/papers/vldb03_ppi.pdf>>, Proceedings of the 29th International Conference on Very Large Data Bases, vol. 29, Sep. 2003, 12 pages.

Bloom, Burton H., "Space/Time Trade-offs in Hash Coding with Allowable Errors," retrieved at <<http://systems.cs.colorado.edu/grunwald/Classes/Fall2003-InformationStorage/Papers/p422-bloom.pdf>>, Communications of the ACM, vol. 13, No. 7, Jul. 1970, pp. 422-426.

Estan, et al., "New Directions in Traffic Measurement and Accounting: Focusing on the Elephants, Ignoring the Mice," retrieved at <<http://www.cs.ucy.ac.cy/courses/EPL606/papers/traffmeas.pdf>>, SIGCOMM'02, Aug. 2002, 14 pages.

Klein, Daniel V., "Foiling the Cracker: A Survey of, and Improvements to, Password Security," retrieved at <<http://www.homeworks.it/Pdf/Foiling%20the%20Cracker.pdf>>, Proceedings of the 2nd USENIX UNIX Security Workshop, 1990, 11 pages.

Norman, Don, "The Way I See It: When security Gets in the Way," retrieved at <<http://www.jnd.org/dn.mss/when_security_gets_in_the_way.html, Don Norman's jnd.org, Aug. 20, 2010, 6 pages.

Spafford, Eugene H., "Observing Reusable Password Choices," retrieved at <<http://reference.kfupm.edu.sa/content/o/b/observing_reusable_password_choices_63578.pdf>>, Purdue Technical Report CD-TR 92-049, Purdue University, Jul. 31, 1992, 14 pages.

Spafford, Eugene H., "OPUS: Preventing Weak Password Choices," retrieved at <<http://ftp9.freebsd.org/pub/papers/Everything/spaf-OPUS.pdf>>, Purdue Technical Report CD-TR 92-028, Purdue University, Jun. 1991, 12 pages.

Florencio, et al., "A Large-Scale Study of Web Password Habits," retrieved at <<http://lemur.ecs.soton.ac.uk/~cjg/www2007/cdrom/src/www2007.org/papers/paper620.pdf>>, Proceedings of the 16th International Conference on World Wide Web, May 2007, pp. 657-665.

Forget, et al., "Improving Text Passwords Through Persuasion," retrieved at <<https://www.ccsl.carleton.ca/paperarchive/forget-soups08.pdf>>, Proceedings of the 4th Symposium on Usable Privacy and Security, Jul. 2008, 12 pages.

Bergadano, et al., "Proactive Password Checking with Decision Trees," retrieved at <<http://www.di.unito.it/~ruffo/concorso/Papers/cccs97.pdf>>, Proceedings of the 4th ACM Conference on Computer and Communications Security, Apr. 1997, pp. 67-77.

Cormode, et al., "An Improved Data Stream Summary: The Count-Min Sketch and Its Applications," retrieved at <<http://www.madalgo.au.dk/img/SumSchoo2007_Lecture%20slides/Bibliography/p14_Cormode_JAI_05.pdf>>, Journal of Algorithms, vol. 55, Apr. 2005, pp. 58-75.

"Consumer Password Worst Practices," retrieved at <<http://www.imperva.com/docs/WP_Consumer_Password_Worst_Practices.pdf.>>, White Paper, Imperva, Redwood Shores, California, 2010, 5 pages.

Yan, Jeff, "A Note on Proactive Password Checking," retrieved at <<http://eref.uqu.edu.sa/files/a_note_on_proactive_password_checking.pdf>>, Proceedings of the 2001 Workshop on New Security Paradigms, Sep. 2001, 16 pages.

St. Clair, et al., "Password Exhaustion: Predicting the End of Password Usefulness," retrieved at <<http://www.enck.org/pubs/iciss06a.pdf>>, ICISS 2006, LNCS 4332, 2006, 19 pages.

Parekh, et al., "Privacy-Preserving Payload-Based Correlation for Accurate Malicious Traffic Detection," retrieved at <<http://sneakers.cs.columbia.edu/ids/publications/lsad.pdf>>, Proceedings of the 2006 SIGCOMM Workshop on Large-scale Attack Defense, Sep. 2006, 8 pages.

Van Oorschot, et al., "On Countering Online Dictionary Attacks with Login Histories and Humans-in-the-Loop," retrieved at <<http://people.scs.carleton.ca/~paulv/papers/tissec-aug06.pdf>>, ACM Transactions on Information and System Security, vol. 9, No. 3, Aug. 2006, pp. 235-258.

(56) References Cited

OTHER PUBLICATIONS

Pinkas, et al., "Securing Passwords Against Dictionary Attacks," retrieved at <<http://www.pinkas.net/PAPERS/pwdweb.pdf>>, Proceedings of the 9th ACM Conference on Computer and Communications Security, Nov. 2002, 14 pages.

Cohen, et al., "Spectral Bloom Filters," retrieved at <<http://wis.cs.ucla.edu/publications/papers/r09p02.pdf>>, Proceedings of the 2003 ACM SIGMOD International Conference on Management of Data, Jun. 2003, pp. 241-252.

Schechter, et al., "It's No Secret: Measuring the Security and Reliability of Authentication via 'Secret' Questions,".Proceedings of the 2009 30th IEEE Symposium on Security and Privacy, May 2009, 16 pages.

Schneier, Bruce, "MySpace Passwords Aren't So Dumb," retrieved at <<http://www.wired.com/politics/security/commentary/securitymatters/2006/12/72300>>, Wired.com, Dec. 14, 2006, 3 pages.

Manber et al., "An Algorithm for Approximate Membership Checking With Application to Password Security," Information Processing Letters, 1994, 10 pages.

Office Action mailed Oct. 26, 2012 for U.S. Appl. No. 12/912,782, filed Oct. 27, 2010, 26 pages.

Response filed Jan. 25, 2013, in response to Office Action mailed Oct. 26, 2012 for U.S. Appl. No. 12/912,782, filed Oct. 27, 2010, 10 pages.

Office Action mailed Mar. 12, 2013, for U.S. Appl. No. 12/912,782, filed Oct. 27, 2010, 22 pages.

Response filed Jun. 7, 2013, in response to Office Action mailed Mar. 12, 2013 for U.S. Appl. No. 12/912,782, filed Oct. 27, 2010, 12 pages.

Office Action mailed Oct. 30, 2013 for U.S. Appl. No. 12/912,782, filed Oct. 27, 2010, 30 pages.

Response filed Jan. 30, 2014, in response to Office Action mailed Oct. 30, 2013 for U.S. Appl. No. 12/912,782, filed Oct. 27, 2010, 17 pages.

Office Action mailed May 21, 2014 for U.S. Appl. No. 12/912,782, filed Oct. 27, 2010, 29 pages.

\* cited by examiner

200b

(2A)

210 — Determine the response indicating an impact on a security strength of the proposed password, based on a selection of the most likely next character, based on initiating a display of the most likely next character of the proposed password, indicating the impact on the security strength of the proposed password 212 — The display of the most likely next character includes sensory feedback indicating one or more warnings to the user of one or more weaknesses associated with at least one candidate password that includes the current prefix character string with the most likely next character as the next character following the current prefix character string, included in the candidate password 214 — The sensory feedback includes one or more of coloring of one or more characters included in the candidate password, underscoring of one or more characters included in the candidate password, coloring of one or more character input devices associated with entry of selected characters, shading variations of portions of the candidate password, flashing of portions of the candidate password, presentation of a score representing a level of security strength or weakness, a placement of the predicted most likely next character in a scoring table, or a placement of the predicted most likely next character appended to the end of the current prefix string (2B)

216 — Determine the response indicating the impact on the security strength of the proposed password, based on initiating disablement of a portion of the user input device that is associated with current input of the most likely next character

218 — Determine the prediction of the most likely next character of the proposed password, based on applying the set of heuristics to the current prefix character string, based on analyses of one or more of popular passwords, dictionary words, popular terms obtained from the Internet, strings modified via character transforms, strings that include at least one repeated character sequence, strings that include at least one interleaved character, character string sequences, palindromes, or a weakness based on n-gram analyses associated with frequently occurring strings of characters (2D)

↓

220 — Obtain a next current prefix character string, based on obtaining at least one next input character from the user input device, after obtaining the current prefix character string

↓

222 — Determine a next prediction of a most likely next character of the proposed password based on applying the set of heuristics to the next current prefix character string

↓

224 — Determine a next response indicating a next impact on the security strength of the proposed password, based on a selection of the next predicted most likely next character

226 — Determine the prediction of the most likely next character of the proposed password, based on the current prefix character string and predictive password heuristics, based on analyses of candidate characters that are predictable based on other characters preceding the candidate characters in the current prefix character string, based on n-gram analyses associated with frequently occurring character strings (2F)

228 — Initiate updates to information associated with the predictive heuristics, based on information associated with determinations of weak password character sequences, obtained via one or more of volunteer submissions, work-for-hire submissions, or a contest (2G)

230 — Determine an aggregate score indicating a current password strength associated with the current prefix character string, based on a sum of predictability values associated with character substrings included in the current prefix character string

FIG. 2d

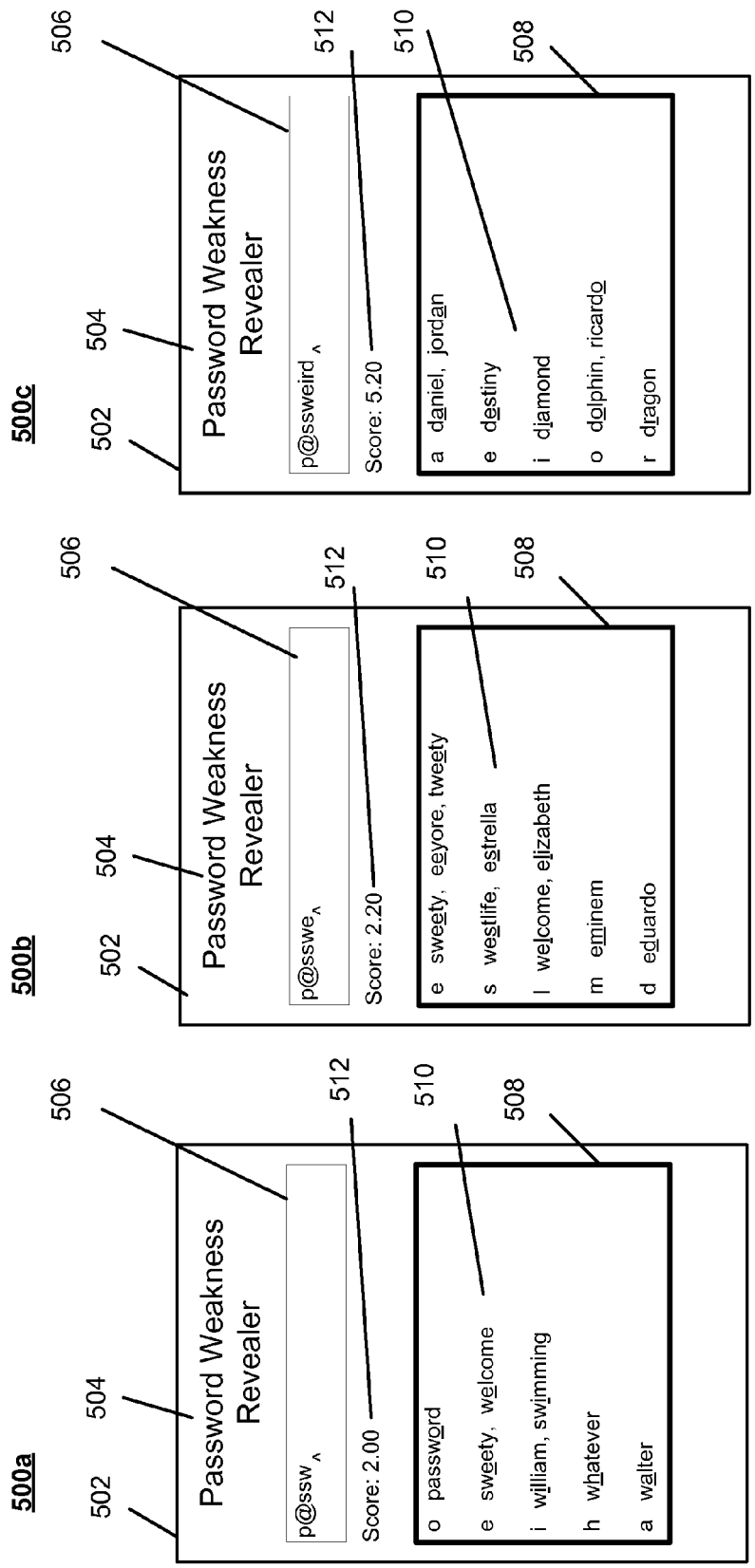

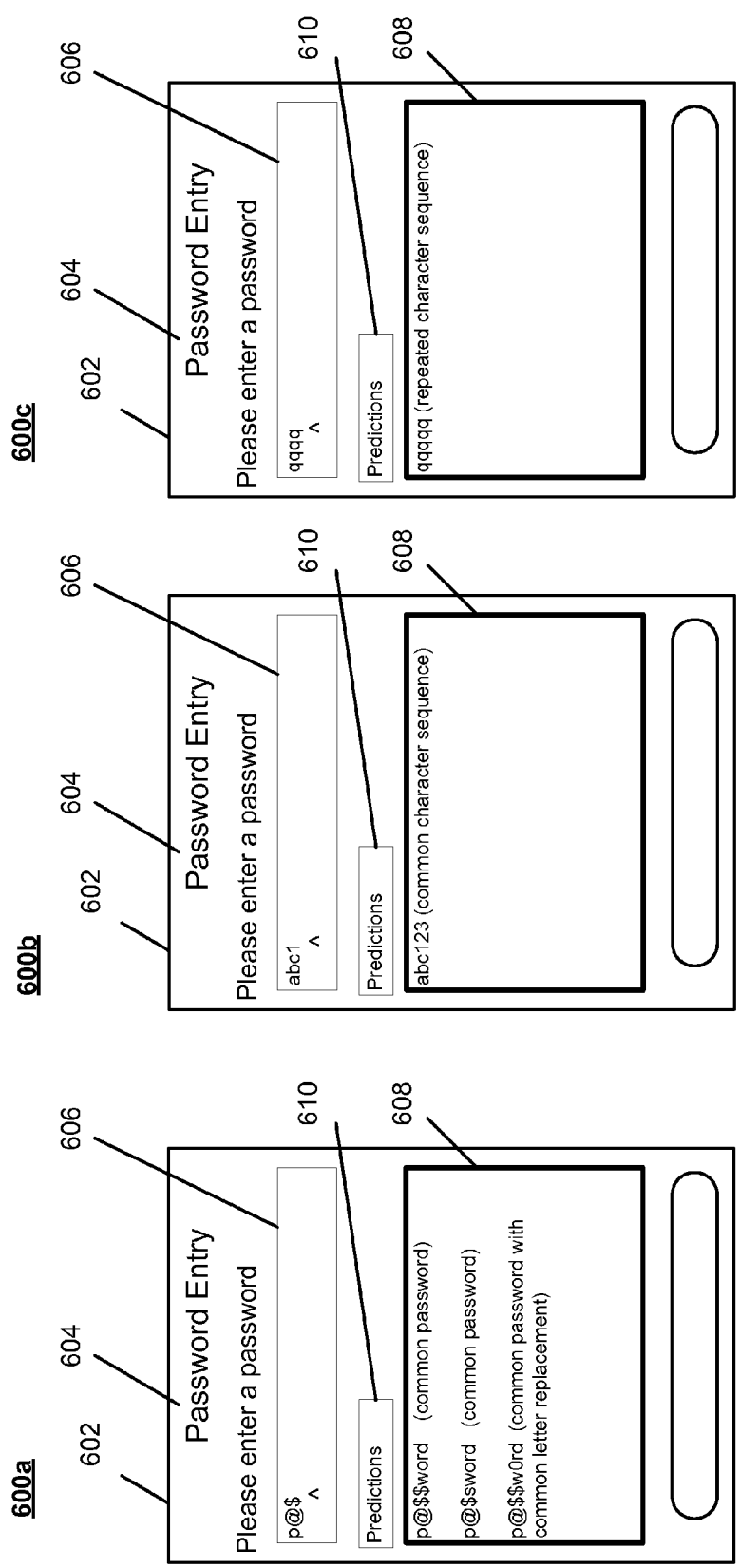

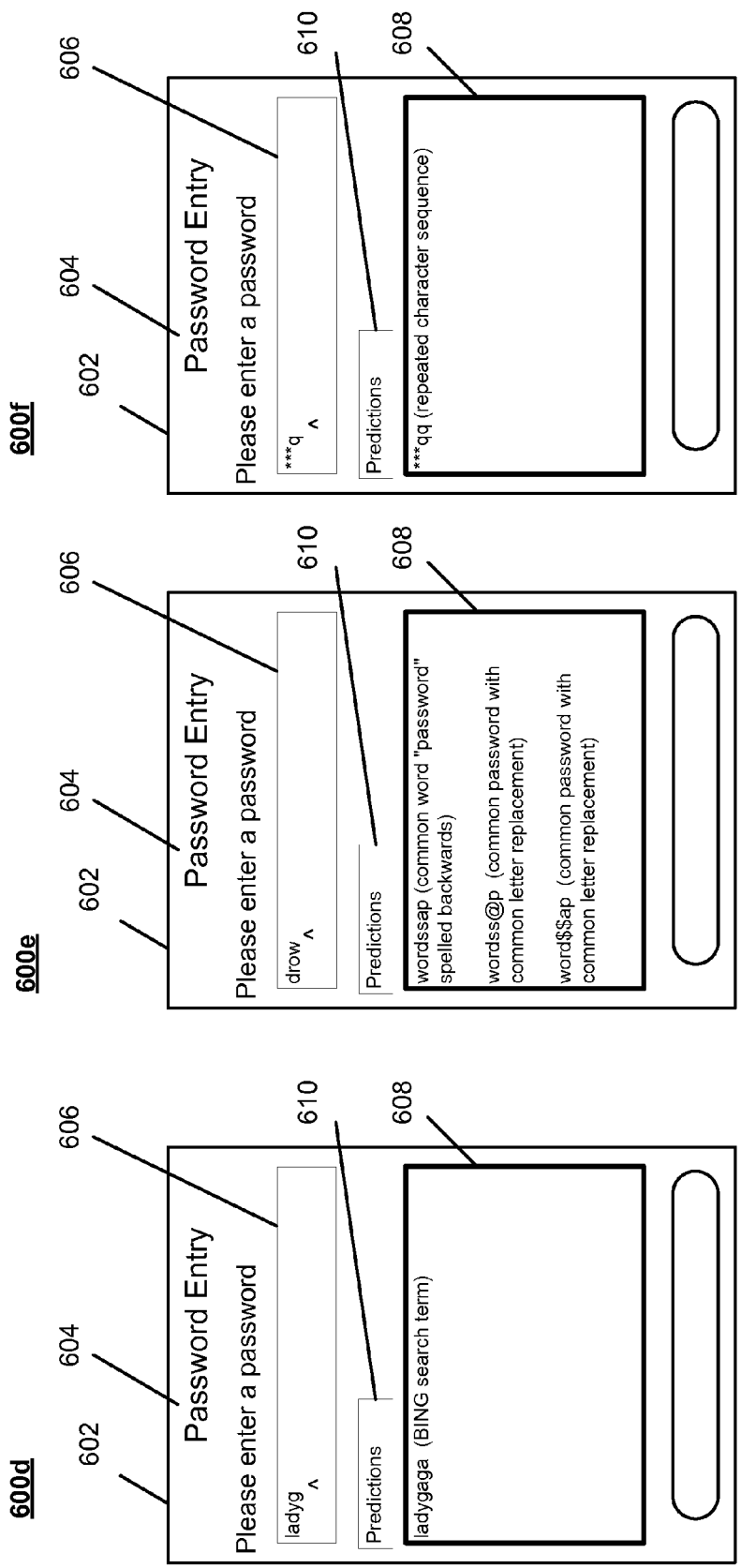

PREDICTING NEXT CHARACTERS IN PASSWORD GENERATION

BACKGROUND

Users of electronic devices frequently need to access systems via user identification including passwords. Further, passwords may be used for protection of information or property. Users may wish to generate passwords that are easily remembered, to avoid writing down the information. However, other unscrupulous users may be able to impermissibly access user accounts and other items if the user passwords are easily guessed (e.g., using "password" or "123123" as a password).

SUMMARY

According to one general aspect, a system may include a prefix acquisition component configured to obtain a current prefix character string received from a user input device, representing a prefix of a proposed password. The system may also include a prediction generator configured to determine, via a device processor, a prediction of a most likely next character of the proposed password based on applying a set of heuristics to the current prefix character string. The system may also include a response generator configured to determine a response indicating an impact on a security strength of the proposed password, based on a selection of the predicted most likely next character.

According to another aspect, a current prefix character string representing a prefix of a proposed password may be provided via a user input device. A real-time response indicating respective impacts on a security strength of the proposed password may be obtained, based on obtaining, via a data processing apparatus, a set of predictions of a most likely next character of the proposed password, based on an application of a set of predictive heuristics to the current prefix character string, and based on predicted selection of respective next input characters from the set of predictions of the most likely next character of the proposed password According to another aspect, a computer program product tangibly embodied on a computer-readable storage medium may include executable code that may cause at least one data processing apparatus to obtain a current prefix character string via a user input device, representing a prefix of a proposed password. Further, the at least one data processing apparatus may determine, via a device processor, a prediction of one or more most likely next characters of the proposed password based on applying a set of predictive heuristics to the current prefix character string. Further, the at least one data processing apparatus may initiate a real-time display indicating an impact on a security strength of the proposed password, based on a selection of the predicted one or more most likely next characters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 5 depicts example user views of example graphical displays on a device.

FIG. 6 depicts example user views of example graphical displays on a device.

DETAILED DESCRIPTION

Figure 1:
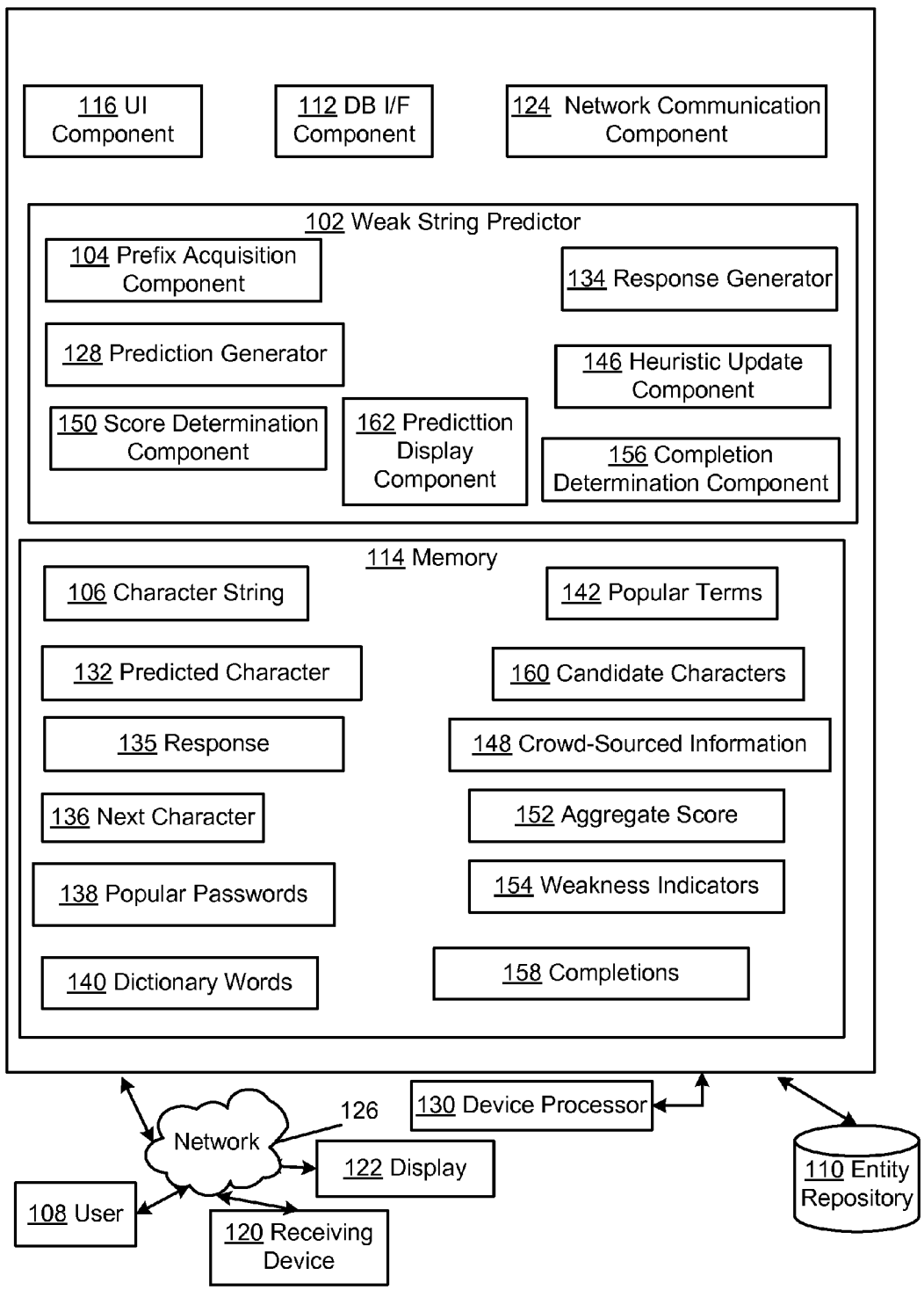
FIG. 1 is a block diagram of an example system for predicting next characters of weak passwords.

Password meters may provide a gauge of password strength. However, conventional password meters may be based on rules ensuring that passwords meet certain arbitrary requirements (e.g., of a certain length, or including uppercase characters, digits, or special characters), and may fail to detect many passwords that either include unacceptably common character sequences (e.g., "pa$$word") or that are generated via unacceptably common techniques (e.g., based on a user's birthdate). When many password meters have identified a password as weak, they have provided scant, or no, quality feedback as to why the password was weak. When feedback is provided it is often unintuitive or it comes too late, e.g., after the user has typed the password. Further, they have provided little help in choosing acceptable passwords.

Example techniques discussed herein may provide real-time user feedback (e.g., as the user enters each character, or even before the user enters any characters) that is intuitive (e.g., the user understands that if what he/she types can be easily predicted by a computer, it can also be predicted by an attacker) and actionable (e.g., the user understands that he/she may make his/her password harder to predict by either avoiding the characters that the system can predict altogether, augmenting the password with additional characters until a sufficient level of unpredictability has been obtained, or some combination of strategies). For example, a user may have already entered one or more characters (which may be referred to herein as a "prefix") of a proposed password, and may receive feedback with regard to a next predicted single character (e.g., that may be part of a multi-character suffix), or a next predicted multi-character string, indicating a measure of strength of the proposed password or security string, if the user were to continue with entry of the prediction. For example, the feedback may provide sensory warnings with regard to a weakness level (or unacceptability level) of the proposed password, if the user were to continue with entry of the prediction.

In this context, "password" may refer to any type of string that may be used for security purposes (e.g., passwords or security strings for accessing systems, documents, or other types of property).

For example, the security of passwords may rest in part in how hard they are for attackers to guess, and in the number of guesses that an attacker can make given a budget (e.g., the number of guesses before a lock-out or a computational limit if the hash of the password is known). However, a user's need to generate passwords that are memorable may cause them to behave in common and predictable ways, leading to passwords that are easy for attackers to guess (e.g., using "password" or "123123" as a password). For example, one common measure of predictability associated with password strings, Shannon entropy, is sometimes calculated by examining how reliably each character can be predicted from the characters that precede it (the prefix of the string, that precedes that character in the string).

In this context, a "weak" password, or a "weakness" of a password may refer to an unacceptable level of predictability associated with the password.

Example techniques discussed herein may provide password meters that indicate to a user that a character string that he/she is entering (or may enter next) is weak by indicating one or more predictions of the next character or set of characters that the user will enter based on the currently entered characters (which may include no characters entered so far, or a null string so far). For example, these predictions may be generated based on n-grams that indicate a likelihood of a next character being entered based on statistics that may be based on real-language text, from analyses of other passwords or commonly-occurring words or phrases, or from rules that detect sequences (e.g., rules that may indicate that "xyzxy" is likely to be followed by "z".) For example, the characters entered by a user may be colored to represent characters that were unpredictable (e.g., green, indicating more secure characters) or predicable (e.g., red), with shades in between. For example, the characters entered by a user may be displayed with other sensory effects (e.g., siren sounding for highly predictable character, blinking effect, foul odors or rumbling effects emitted from sensory output devices for highly predictable characters). For example, a character entry device may block entry of a next character determined as less secure (e.g., locking portions of a keyboard to prevent entry of less secure next characters, or not displaying less secure characters on a displayed keyboard such as a touchscreen keyboard), or may provide desirable/undesirable effects associated with keys associated with, or icons or other objects representing, respective desirable/undesirable next characters for user consideration.

The display of predicted single characters or multi-character sequences may provide users with an understanding of why entering a certain character next will yield a low per-letter score, why the characters are being predicted (e.g., the predicted string is in a dictionary or the predicted characters are next in a sequences), as well as an understanding of which characters are left (characters that are not predicted), and are thus likely to yield a high per-letter score.

Example techniques discussed herein may provide a real-time display of predicted next single characters or next multi-character sequences of incompletely entered proposed passwords or security strings to indicate to the user that what he/she is entering is predictable (and may thus be undesirable or unacceptable). For example, if the user enters "p@$$", a display may indicate a prediction of "p@$$word", "p@$ssw0rd", and "p@$$vvord" to indicate that a "w" or "v" may be a predictable next character. Such suggestions are different from "autocomplete" suggestions, as these suggestions discourage users from typing characters that are predictable, whereas autocomplete offers to finish entire words or phrases when doing so is desirable. Furthermore, autocomplete suggests only completion of previously-witnessed common strings whereas example password character prediction techniques as discussed herein may be based on heuristics and may anticipate passwords that have never been typed before.

According to an example embodiment, in contexts where the current string already entered by the user (e.g., a "prefix" string) should not be displayed, only a predicted single next character (e.g., that may be part of a predictable next multi-character string), or a predicted next multi-character string may be shown. In this context, a "character string" may refer to a string of one or more characters.

Example techniques discussed herein may provide summing of the predictability of a character or sequence to generate an aggregate score that users may understand as an example measure of their password strength or other type of security string strength.

According to an example embodiment, a null prediction may be displayed to a user to indicate that the user has entered an acceptably strong password or password prefix.

Example techniques discussed herein may provide a display of different colors for different characters to indicate their level of predictability.

Example techniques discussed herein may use crowd-sourcing to identify behaviors that may be common enough to be predictable, allowing heuristics to be refined to predict them, thus increasing the set of potentially-weak passwords that may be detected and discouraged.

As further discussed herein, FIG. 1 is a block diagram of a system 100 for predicting next characters of weak passwords. As shown in FIG. 1, a system 100 may include a weak string predictor 102 that includes a prefix acquisition component 104 that may be configured to obtain a current prefix character string 106 received from a user input device, representing a prefix of a proposed password. For example, a user 108 may be entering the proposed password via the user input device.

According to an example embodiment, the weak string predictor 102, or one or more portions thereof, may include executable instructions that may be stored on a computer-readable storage medium, as discussed below. According to an example embodiment, the computer-readable storage medium may include any number of storage devices, and any number of storage media types, including distributed devices.

For example, an entity repository 110 may include one or more databases, and may be accessed via a database interface component 112. One skilled in the art of data processing will appreciate that there are many techniques for storing repository information discussed herein, such as various types of database configurations (e.g., relational databases, hierarchical databases, distributed databases) and non-database configurations.

According to an example embodiment, the weak string predictor 102 may include a memory 114 that may store the first character string 106. In this context, a "memory" may include a single memory device or multiple memory devices configured to store data and/or instructions. Further, the memory 114 may span multiple distributed storage devices.

According to an example embodiment, a user interface component 116 may manage communications between the user 108 and the weak string predictor 102. The user 108 may be associated with a receiving device 120 that may be associated with a display 122 and other input/output devices. For example, the display 122 may be configured to communicate with the receiving device 120, via internal device bus communications, or via at least one network connection.

According to example embodiments, the display 122 may be implemented as a flat screen display, a print form of display, a two-dimensional display, a three-dimensional display, a static display, a moving display, sensory displays such as tactile output, audio output, and any other form of output for communicating with a user (e.g., the user 108).

According to an example embodiment, the weak string predictor 102 may include a network communication component 124 that may manage network communication between the weak string predictor 102 and other entities that may communicate with the weak string predictor 102 via at least one network 126. For example, the at least one network 126 may include at least one of the Internet, at least one wireless network, or at least one wired network. For example, the at least one network 126 may include a cellular network, a radio network, or any type of network that may support transmission of data for the weak string predictor 102. For example, the network communication component 124 may manage network communications between the weak string predictor 102 and the receiving device 120. For example, the network communication component 124 may manage network communication between the user interface component 116 and the receiving device 120.

A prediction generator 128 may be configured to determine, via a device processor 130, a prediction of a most likely next character 132 of the proposed password based on applying a set of heuristics to the current prefix character string 106.

For example, the heuristics may include predictive heuristics that may include analyses of one or more of popular passwords, dictionary words, popular terms obtained from the Internet, strings modified via character transforms, strings that include at least one repeated character sequence, strings that include at least one interleaved character, character string sequences, or palindromes, as discussed further herein. For example, the predictive heuristics may include analyses of candidate characters that are predictable based on other characters preceding the candidate characters in the one of the first weak password completions, based on n-gram analyses associated with frequently occurring character strings. One skilled in the art of data processing will understand that other predictive heuristics may also be used by example techniques discussed herein, without departing from the spirit of the discussion herein.

In this context, a "processor" may include a single processor or multiple processors configured to process instructions associated with a processing system. A processor may thus include one or more processors processing instructions in parallel and/or in a distributed manner. Although the device processor 130 is depicted as external to the weak string predictor 102 in FIG. 1, one skilled in the art of data processing will appreciate that the device processor 130 may be implemented as a single component, and/or as distributed units which may be located internally or externally to the weak string predictor 102, and/or any of its elements.

A response generator 134 may be configured to determine a response 135 indicating an impact on a security strength of the proposed password, based on a selection of the predicted most likely next character 132. For example, the response 135 may be determined based on an impact on a security strength of the proposed password, based on a measure of weakness of a candidate password that includes the current prefix character string 106 with the predicted most likely next character 132 as a next character following the current prefix character string 106, included in the candidate password According to an example embodiment, if the current prefix character string 106 has zero length, the prediction generator 128 may determine the prediction of the most likely next character 132 of the proposed password, based on a prediction of an initial input character associated with the proposed password, based on a current null prefix character string and applying a set of predictive password heuristics and data associated with initial characters associated with passwords.

According to an example embodiment, the response generator 134 may determine the response 135 indicating an impact on a security strength of the proposed password, based on a selection of the most likely next character 132, based on initiating a display of the most likely next character 132 of the proposed password, indicating the impact on the security strength of the proposed password. For example, the display may indicate weakness attributes associated with the measure of weakness of the candidate password that includes the current prefix character string 106 with the next predicted input character 132 as a next character following the current prefix character string 106, included in the candidate password.

According to an example embodiment, the display of the most likely next character 132 may include sensory feedback indicating one or more warnings to the user 108 of one or more weaknesses associated with the at least one candidate password that includes the current prefix character string 106 with the most likely next character 132 as the next character following the current prefix character string 106, included in the candidate password.

According to an example embodiment, the sensory feedback may include one or more of coloring of one or more characters included in the candidate password, underscoring of one or more characters included in the candidate password, coloring of one or more character input devices associated with entry of selected characters, shading variations of portions of the candidate password, flashing of portions of the candidate password, presentation of a score representing a level of security strength or weakness, a placement of the predicted most likely next character in a scoring table, or a placement of the predicted most likely next character appended to the end of the current prefix string.

According to an example embodiment, the response generator 134 may determine the response 135 indicating the impact on the security strength of the proposed password, based on initiating disablement of a portion of the user input device that is associated with current input of the most likely next character 132.

According to an example embodiment, the prediction generator 128 may determine the prediction of the most likely next character 132 of the proposed password, based on applying the set of heuristics to the current prefix character string 106, based on analyses of one or more of popular passwords, dictionary words, popular terms obtained from the Internet, strings modified via character transforms, strings that include at least one repeated character sequence, strings that include at least one interleaved character, character string sequences, palindromes, or a weakness based on n-gram analyses associated with frequently occurring strings of characters.

According to an example embodiment, the prefix acquisition component 104 may obtain a next current prefix character string 106, based on obtaining at least one next input character 136 from the user input device, after obtaining the first current prefix character string 106.

According to an example embodiment, the prediction generator 128 may determine a next prediction of a most likely next character 132 of the proposed password based on applying the set of heuristics to the next current prefix character string 106.

According to an example embodiment, the response generator 134 may determine a next response 135 indicating a next impact on the security strength of the proposed password, based on a selection of the next predicted most likely next character 132. For example, the next response 135 indicating a next impact may include second weakness attributes associated with a measure of weakness of a next candidate password that includes the next current prefix character string 106 with the next predicted most likely next character 132 as a next character following the next current prefix character string 106, included in the next candidate password.

According to an example embodiment, the prediction generator 128 may determine the prediction of the most likely next character 132 of the proposed password, based on the current prefix character string 106 and predictive password heuristics, based on analyses of candidate characters that are predictable based on other characters preceding the candidate characters in the current prefix character string 106, based on n-gram analyses associated with frequently occurring character strings.

According to an example embodiment, a heuristic update component 146 may initiate updates to information associated with the predictive heuristics, based on information associated with determinations of weak password character sequences, obtained via one or more of volunteer submissions, work-for-hire submissions, or a contest. For example, the information may include crowd-sourced information 148.

According to an example embodiment, a password score determination component 150 may be configured to determine an aggregate score 152 indicating a current password strength associated with the current prefix character string 106, based on a sum of predictability values associated with character substrings included in the current prefix character string 106.

According to an example embodiment, the prediction generator 128 may determine one or more weakness indicators 154 associated with the predicted most likely next character 132 of the proposed password.

According to an example embodiment, the response generator 134 may determine the response 135 based on initiating a real-time display, to the user 108, of the predicted most likely next character 132 of the proposed password and the one or more weakness indicators 154 associated with the predicted most likely next character 132 indicating weakness of the predicted most likely next character 132.

According to an example embodiment, the one or more weakness indicators 154 may include identification of one or more of a popular password 138, a score indicating a strength of at least a portion of the proposed password, dictionary words 140, popular terms 142 obtained from the Internet, strings modified via character transforms, strings that include at least one repeated character sequence, strings that include at least one interleaved character, character string sequences, palindromes, or a weakness based on n-gram analyses associated with frequently occurring strings of characters.

According to an example embodiment, a completion determination component 156 may determine, via the device processor 130, one or more first weak password completions 158 associated with the first character string 106, based on predictive heuristics.

According to an example embodiment, the completion determination component 156 may determine the one or more first weak password completions 158 associated with the first character string 106, based on predictive heuristics, based on analyses of one or more of popular passwords 138, dictionary words 140, popular terms 142 obtained from the Internet, strings modified via character transforms, strings that include at least one repeated character sequence, strings modified via character transforms, character string sequences, palindromes, or n-gram analyses associated with frequently occurring strings of characters.

According to an example embodiment, the completion determination component 156 may determine one of the first weak password completions 158 associated with the first character string 106, based on predictive heuristics, based on analyses of candidate characters 160 that are predictable based on other characters preceding the candidate characters 160 in the one of the first weak password completions 158, based on n-gram analyses associated with frequently occurring character strings.

According to an example embodiment, the completion determination component 156 may determine one or more weakness indicators 154 associated with each respective first weak password completion 158, as discussed further below.

According to an example embodiment, a prediction display component 162 may initiate a real-time display of first weak password completions 158, for example, as the user 108 continues to enter the next character 136 of an input string. The next character 136 may then be used to determine a next prediction of a weak password, as discussed further below.

Figure 2A:
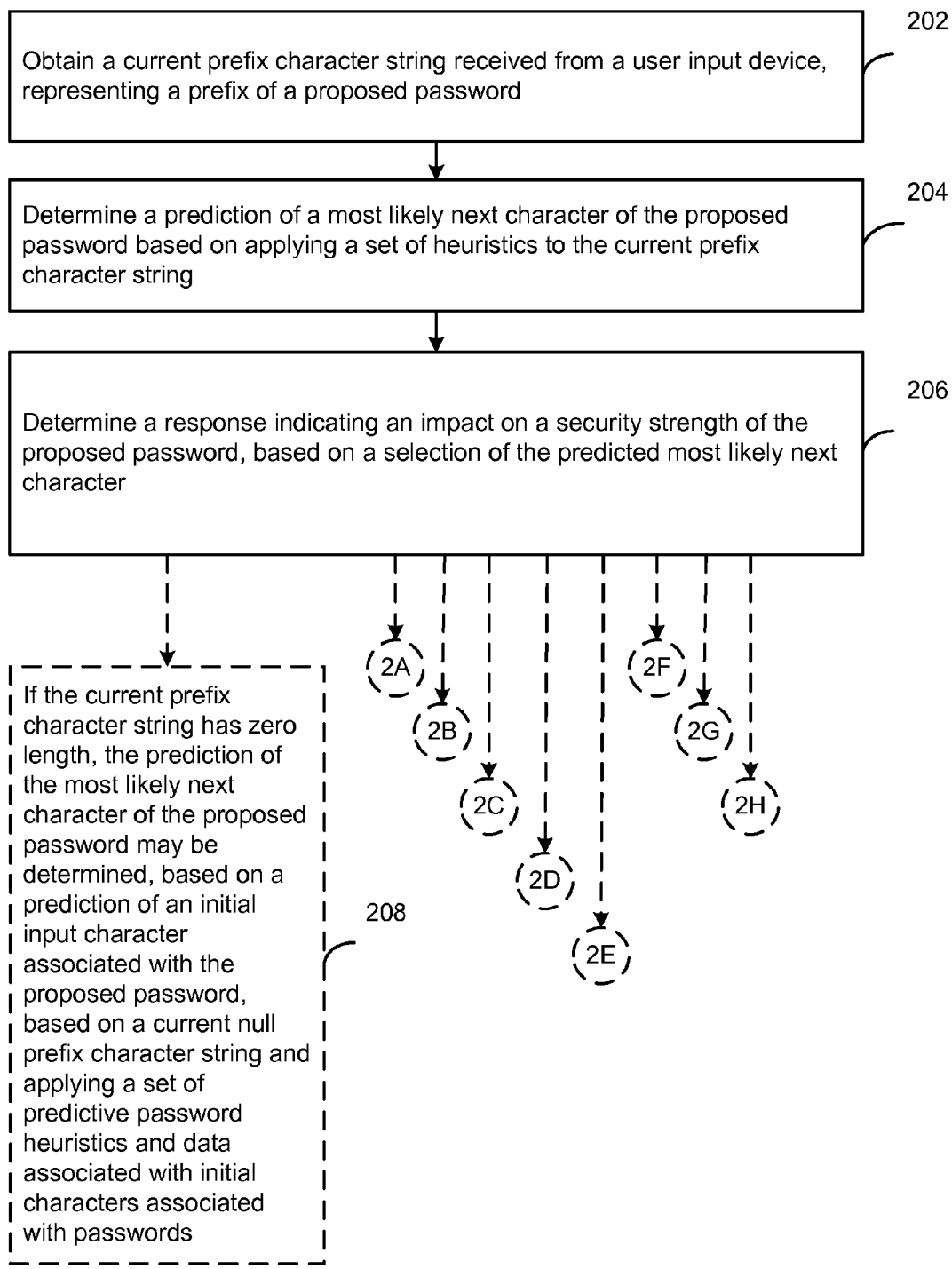
FIG. 2 is a flowchart illustrating example operations of the system of FIG. 1.
Figure 2E:
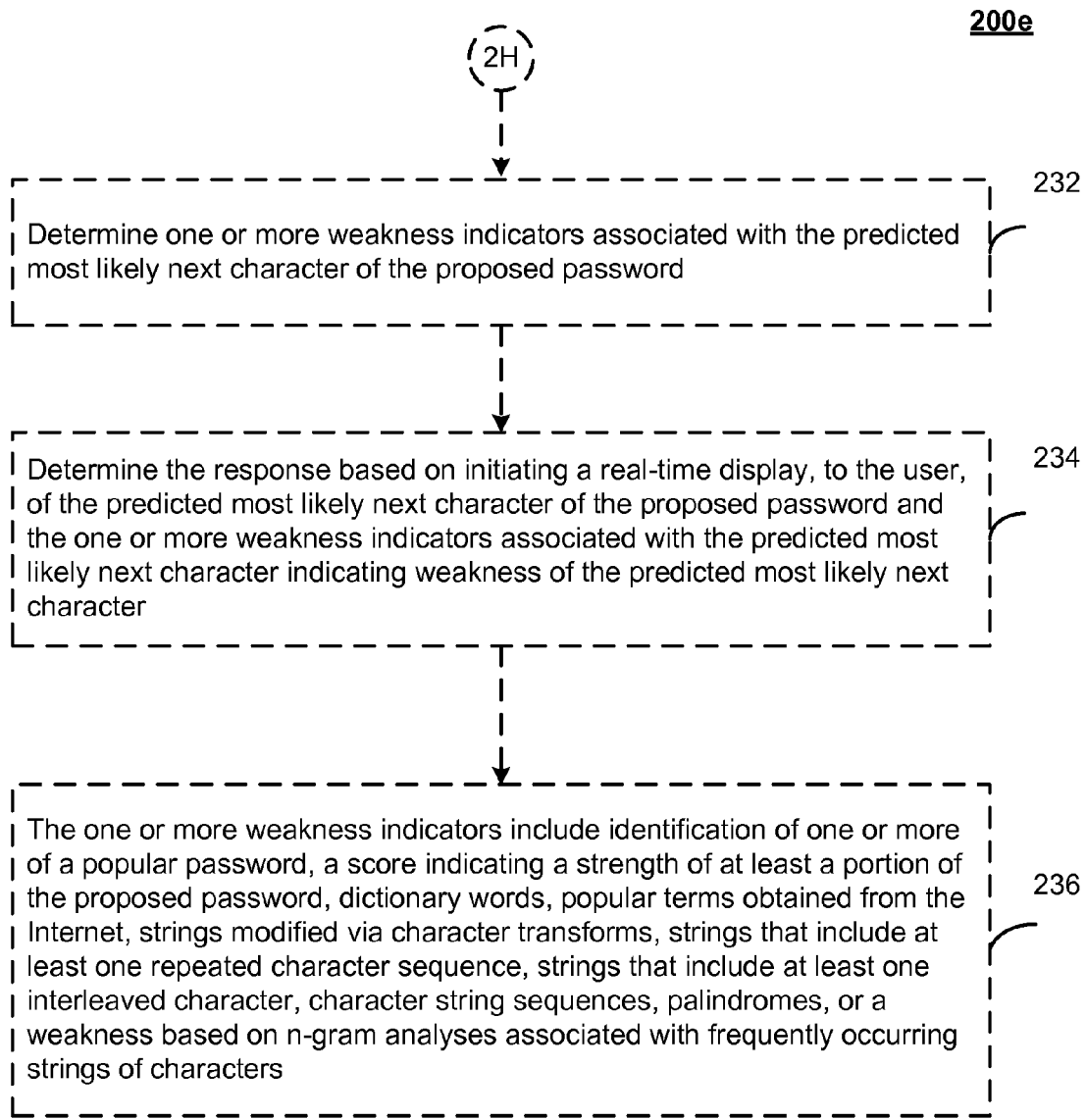

FIG. 2 is a flowchart illustrating example operations of the system of FIG. 1, according to example embodiments. In the example of FIG. 2a, a current prefix character string received from a user input device, representing a prefix of a proposed password may be obtained (202). For example, the prefix acquisition component 104 may obtain a current prefix character string 106 received from a user input device, representing a prefix of a proposed password, as discussed above.

A prediction of a most likely next character of the proposed password may be determined based on applying a set of heuristics to the current prefix character string (204). For example, the prediction generator 128 may determine, via the device processor 130, a prediction of a most likely next character 132 of the proposed password based on applying a set of heuristics to the current prefix character string 106, as discussed above.

A response indicating an impact on a security strength of the proposed password may be determined, based on a selection of the predicted most likely next character (206). For example, the response generator 134 may determine a response 135 indicating an impact on a security strength of the proposed password, based on a selection of the predicted most likely next character 132, as discussed above.

According to an example embodiment, if the current prefix character string has zero length, the prediction of the most likely next character of the proposed password may be determined, based on a prediction of an initial input character associated with the proposed password, based on a current null prefix character string and applying a set of predictive password heuristics and data associated with initial characters associated with passwords (208). For example, if the current prefix character string 106 has zero length, the prediction generator 128 may determine the prediction of the most likely next character 132 of the proposed password, based on a prediction of an initial input character associated with the proposed password, based on a current null prefix character string and applying a set of predictive password heuristics and data associated with initial characters associated with passwords, as discussed above.

According to an example embodiment, the response indicating an impact on a security strength of the proposed password may be determined based on a selection of the most likely next character, based on initiating a display of the most likely next character of the proposed password, indicating the impact on the security strength of the proposed password (210). For example, the response generator 134 may determine the response 135 indicating an impact on a security strength of the proposed password, based on a selection of the most likely next character 132, based on initiating a display of the most likely next character 132 of the proposed password, indicating the impact on the security strength of the proposed password, as discussed above.

According to an example embodiment, the display of the most likely next character may include sensory feedback indicating one or more warnings to the user of one or more weaknesses associated with at least one candidate password that includes the current prefix character string with the most likely next character as the next character following the current prefix character string, included in the candidate password (212).

According to an example embodiment, the sensory feedback may include one or more of coloring of one or more characters included in the candidate password, underscoring of one or more characters included in the candidate password, coloring of one or more character input devices associated with entry of selected characters, shading variations of portions of the candidate password, flashing of portions of the candidate password, presentation of a score representing a level of security strength or weakness, a placement of the predicted most likely next character in a scoring table, or a placement of the predicted most likely next character appended to the end of the current prefix string (214).

According to an example embodiment, the response indicating the impact on the security strength of the proposed password may be determined based on initiating disablement of a portion of the user input device that is associated with current input of the most likely next character (216). For example, the response generator 134 may determine the response 135 indicating the impact on the security strength of the proposed password, based on initiating disablement of a portion of the user input device that is associated with current input of the most likely next character 132, as discussed above.

According to an example embodiment, the prediction of the most likely next character of the proposed password may be determined, based on applying the set of heuristics to the current prefix character string, based on analyses of one or more of popular passwords, dictionary words, popular terms obtained from the Internet, strings modified via character transforms, strings that include at least one repeated character sequence, strings that include at least one interleaved character, character string sequences, palindromes, or a weakness based on n-gram analyses associated with frequently occurring strings of characters (218). For example, the prediction generator 128 may determine the prediction of the most likely next character 132 of the proposed password, based on applying the set of heuristics to the current prefix character string 106, based on analyses of one or more of popular passwords, dictionary words, popular terms obtained from the Internet, strings modified via character transforms, strings that include at least one repeated character sequence, strings that include at least one interleaved character, character string sequences, palindromes, or a weakness based on n-gram analyses associated with frequently occurring strings of characters, as discussed above.

According to an example embodiment, a next current prefix character string may be obtained, based on obtaining at least one next input character from the user input device, after obtaining the current prefix character string (220). For example, the prefix acquisition component 104 may obtain a next current prefix character string 106, based on obtaining at least one next input character 136 from the user input device, after obtaining the first current prefix character string 106, as discussed above.

According to an example embodiment, a next prediction of a most likely next character of the proposed password may be determined, based on applying the set of heuristics to the next current prefix character string (222). For example, the prediction generator 128 may determine the next prediction of a most likely next character 132 of the proposed password based on applying the set of heuristics to the next current prefix character string 106, as discussed above.

According to an example embodiment, a next response indicating a next impact on the security strength of the proposed password may be determined, based on a selection of the next predicted most likely next character (224). For example, the response generator 134 may determine the next response 135 indicating a next impact on the security strength of the proposed password, based on a selection of the next predicted most likely next character 132, as discussed above.

According to an example embodiment, the prediction of the most likely next character of the proposed password may be determined, based on the current prefix character string and predictive password heuristics, based on analyses of candidate characters that are predictable based on other characters preceding the candidate characters in the current prefix character string, based on n-gram analyses associated with frequently occurring character strings (226). For example, the prediction generator 128 may determine the prediction of the most likely next character 132 of the proposed password, based on the current prefix character string 106 and predictive password heuristics, based on analyses of candidate characters that are predictable based on other characters preceding the candidate characters in the current prefix character string 106, based on n-gram analyses associated with frequently occurring character strings, as discussed above.

According to an example embodiment, updates to information associated with the predictive heuristics may be initiated, based on information associated with determinations of weak password character sequences, obtained via one or more of volunteer submissions, work-for-hire submissions, or a contest (228). For example, the heuristic update component 146 may initiate updates to information associated with the predictive heuristics, as discussed above.

According to an example embodiment, an aggregate score indicating a current password strength associated with the current prefix character string may be determined, based on a sum of predictability values associated with character substrings included in the current prefix character string (230). For example, the password score determination component 150 may determine an aggregate score 152 indicating a current password strength associated with the current prefix character string 106, based on a sum of predictability values associated with character substrings included in the current prefix character string 106, as discussed above.

According to an example embodiment, one or more weakness indicators associated with the predicted most likely next character of the proposed password may be determined (232). For example, the prediction generator 128 may determine one or more weakness indicators 154 associated with the predicted most likely next character 132 of the proposed password, as discussed above.

According to an example embodiment, the response may be determined based on initiating a real-time display, to the user, of the predicted most likely next character of the proposed password and the one or more weakness indicators associated with the predicted most likely next character indicating weakness of the predicted most likely next character (234). For example, the response generator 134 may determine the response 135 based on initiating a real-time display, to the user 108, of the predicted most likely next character 132 of the proposed password and the one or more weakness indicators 154 associated with the predicted most likely next character 132 indicating weakness of the predicted most likely next character 132, as discussed above.

According to an example embodiment, the one or more weakness indicators may include identification of one or more of a popular password, a score indicating a strength of at least a portion of the proposed password, dictionary words, popular terms obtained from the Internet, strings modified via character transforms, strings that include at least one repeated character sequence, strings that include at least one interleaved character, character string sequences, palindromes, or a weakness based on n-gram analyses associated with frequently occurring strings of characters (236).

Figure 3A:
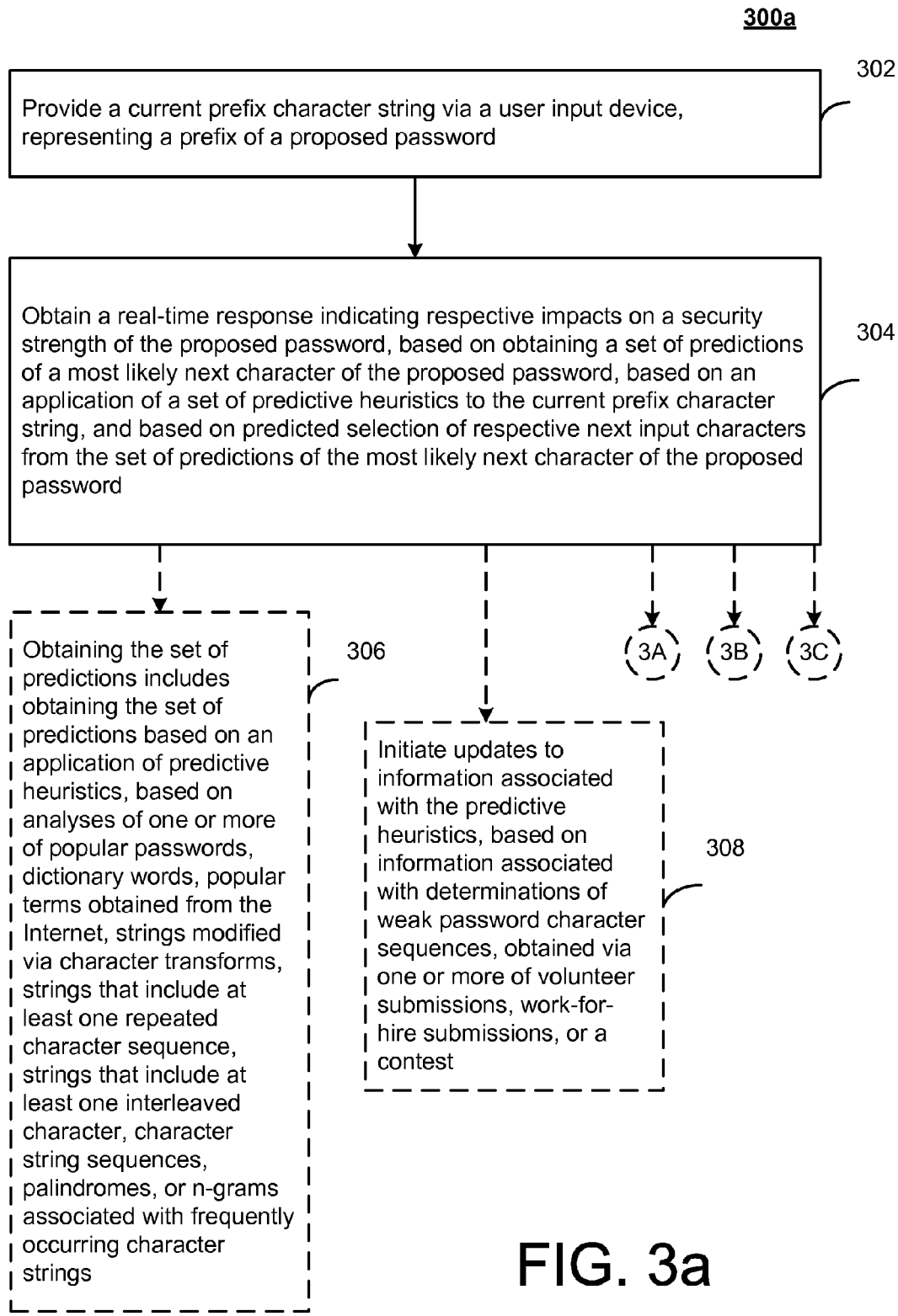
FIG. 3 is a flowchart illustrating example operations of the system of FIG. 1.
Figure 3B:
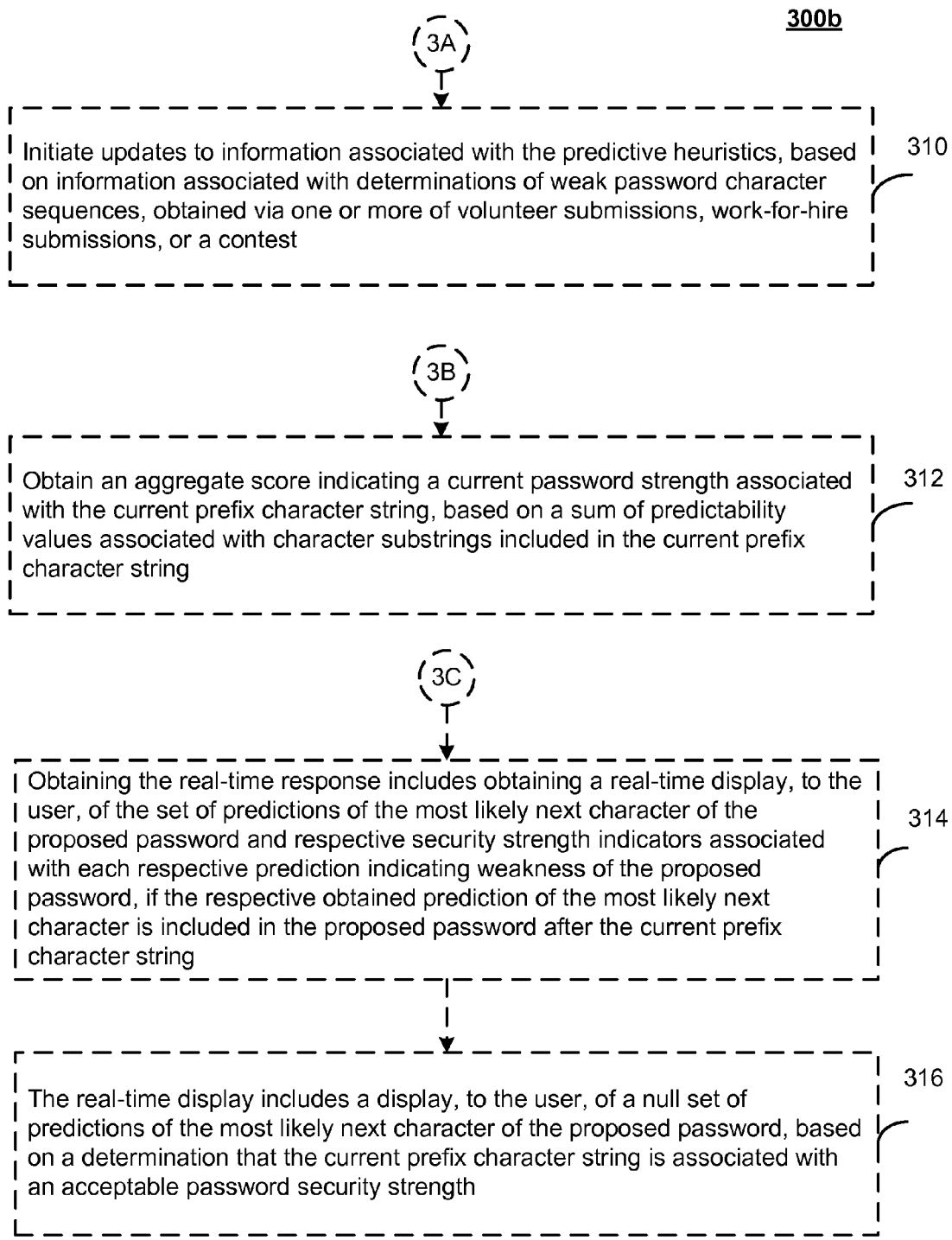

FIG. 3 is a flowchart illustrating example operations of the system of FIG. 1, according to example embodiments. In the example of FIG. 3a, a current prefix character string representing a prefix of a proposed password may be provided via a user input device (302). For example, the user 108 may provide the current prefix character string 106. For example, the prefix acquisition component 104 may provide the current prefix character string 106, as discussed above.

A real-time response indicating respective impacts on a security strength of the proposed password may be obtained, based on obtaining, via a data processing apparatus, a set of predictions of a most likely next character of the proposed password, based on an application of a set of predictive heuristics to the current prefix character string, and based on predicted selection of respective next input characters from the set of predictions of the most likely next character of the proposed password (304). For example, the response generator 134 may determine the real-time response 135, as discussed above. In this context, a "set of predictions" may refer to zero or more predictions.

According to an example embodiment, obtaining the set of predictions may include obtaining the set of predictions based on an application of predictive heuristics, based on analyses of one or more of popular passwords, dictionary words, popular terms obtained from the Internet, strings modified via character transforms, strings that include at least one repeated character sequence, strings that include at least one interleaved character, character string sequences, palindromes, or n-grams associated with frequently occurring character strings (308). For example, the prediction generator 128 may obtain the set of predictions 132, as discussed above.

According to an example embodiment, updates to information associated with the predictive heuristics may be initiated, based on information associated with determinations of weak password character sequences, obtained via one or more of volunteer submissions, work-for-hire submissions, or a contest (310). For example, the heuristic update component 146 may initiate updates to information associated with the predictive heuristics, as discussed above.

According to an example embodiment, an aggregate score indicating a current password strength associated with the current prefix character string may be obtained, based on a sum of predictability values associated with character substrings included in the current prefix character string (312). For example, the password score determination component 150 may password score determination component 150 may determine an aggregate score 152 indicating a current password strength associated with the current prefix character string, based on a sum of predictability values associated with character substrings included in the current prefix character string 106, as discussed above.

According to an example embodiment, obtaining the real-time response may include obtaining a real-time display, to the user, of the set of predictions of the most likely next character of the proposed password and respective security strength indicators associated with each respective prediction indicating weakness of the proposed password, if the respective obtained prediction of the most likely next character is included in the proposed password after the current prefix character string (314).

According to an example embodiment, the real-time display may include may include a display, to the user, of a null set of predictions of the most likely next character of the proposed password, based on a determination that the current prefix character string is associated with an acceptable password security strength (316).

Figure 4:
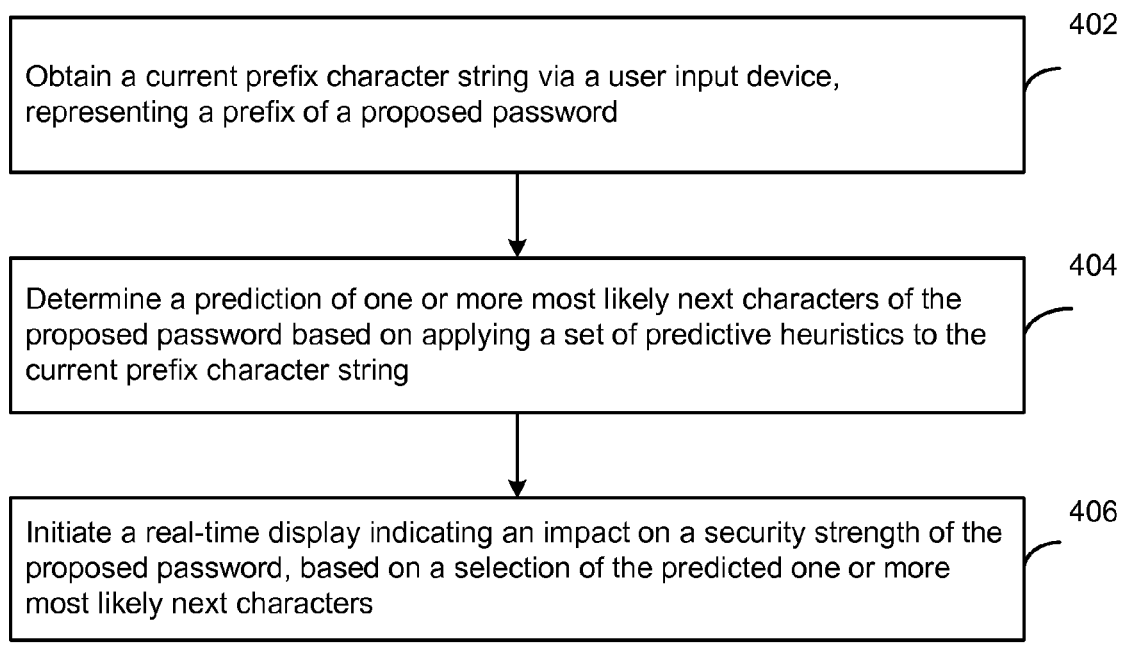
FIG. 4 is a flowchart illustrating example operations of the system of FIG. 1.

FIG. 4 is a flowchart illustrating example operations of the system of FIG. 1, according to example embodiments. In the example of FIG. 4, a current prefix character string representing a prefix of a proposed password may be obtained via a user input device (402). For example, the prefix acquisition component 104 may obtain the current prefix character string 106 representing a prefix of a proposed password, as discussed above.

A prediction of one or more most likely next characters of the proposed password may be determined, based on applying a set of predictive heuristics to the current prefix character string (404). For example, the prediction generator 128 may determine the prediction 132, as discussed above.

A real-time display indicating an impact on a security strength of the proposed password may be initiated, based on a selection of the predicted one or more most likely next characters (406). For example, the response generator 134 may determine the response 135 indicating an impact on a security strength of the proposed password, based on a selection of the most likely next character 132, based on initiating a display of the most likely next character 132 of the proposed password, indicating the impact on the security strength of the proposed password, as discussed above.

It may be difficult to prove that a password is strong, as a password that appears strong may be predictable due to a behavior that has only recently become common among users or that is common for reasons not yet anticipated by a password checker. For example, a password generated pseudorandomly may be strong if the seed is unknown, but weak if the seed is accidentally re-used.

Another difficulty in determining formulas for generating strong passwords involves the concept that, the more users follow the same formula, the more they are likely to follow similar (and thus more predictable) actions in the future.

Example techniques discussed herein may provide feedback that is timely, makes clear to the user why the string that the user is entering may lead to a weak password, and that may generate a visceral response, for example, so that users may be inspired to change behavior. Such example techniques may serve as preventive measures for preventing users from choosing passwords with features that may be associated with weaker passwords (e.g., the selection of common strings, numbers, or dates).

For example, a user may begin entry of a password or other key or password that begins with a prefix string such as "p@$", "abc1", "qqqq", "ladyg", or "drow". Example techniques discussed herein may provide such users with immediate feedback on an example prediction system may predict that such users will enter as next input characters.

According to an example embodiment, password completions displayed to the user may be phased down or out if the password entered by the user is judged strong. This may be based on the aggregate score 152, so that the level of feedback decreases as the score increases. For example, the user may receive several suggestions when the aggregate score 152 is low, fewer as it increases, and none at all when it exceeds a predetermined threshold value. For example, if a user enters "pass" there may be strong predictions that the next character might be "w" and may be discouraged. However, if the user has entered a reasonably random prefix string such as "hd8^sdf$5pa" it may not be possible to predict a next character or string, and so it may be desirable to phase the feedback down or out. Thus, if the user has entered "pass" an example system may provide the feedback that the prefix string entered by the user so far is not a strong password, and the following list of autocompletes may not provide substantial help to the user. However, if the user has entered a strong prefix string, phasing down or out of suggestions may indicate that the user has a reasonably strong prefix string.

FIG. 5 depicts example user views of example graphical displays on a device 502. As shown in FIG. 5a, a password entry prompt 504 may request entry of a password or other security string in an entry text box 506. A revealer text box 508 may display real-time revelations 510 of predicted weak characters or multi-character strings, based on a current prefix string being entered by a user. As an example, a user may have already entered "p@ssw" as a current input string in the entry text box 506, and may be provided with a real-time display of a prediction list (e.g., in the revealer text box 508). For example, as shown in FIG. 5a, it is revealed that, if "o" is a next entered character, a predicted string (based on n-gram analysis) may include "password". Similarly, if "e" is a next entered character, predicted strings may include "sweety" and "welcome". Further, if "i" is a next entered character, predicted strings may include "william" and "swimming". If "h" is a next entered character, predicted strings may include "whatever", while if "a" is a next entered character, predicted strings may include "walter". According to example embodiments, portions of the predicted strings that precede the next predicted character may be dimmed in display, to focus user attention on the next predicted character, which may be further enhanced by underlining the next predicted character in the strings. As shown on FIG. 5a, a score 512 (e.g., the aggregate score 152) may be displayed for the user, to inform him/her of a weakness level of his/her current password or security string prefix. According to an example embodiment, a score may be displayed in association with each prediction.

As shown in FIG. 5b, the user may have already entered "p@sswe" as a current input string in the entry text box 506, and it may be revealed that, if "e" is a next entered character, predicted strings may include "sweety", "eeyore", and "tweety". Similarly, if "s" is a next entered character, predicted strings may include "westlife" and "estrella". Further, if "l" is a next entered character, predicted strings may include "welcome" or "elizabeth". If "m" is a next entered character, predicted strings may include "eminem", while if "d" is a next entered character, predicted strings may include "eduardo".

As shown in FIG. 5c, the user may have already entered "p@ssweird" as a current input string in the entry text box 506, and it may be revealed that, if "a" is a next entered character, predicted strings may include "daniel", and "jordan". Similarly, if "e" is a next entered character, predicted strings may include "destiny". Further, if "i" is a next entered character, predicted strings may include "diamond". If "o" is a next entered character, predicted strings may include "dolphin" and "ricardo", while if "r" is a next entered character, predicted strings may include "dragon".

FIG. 6 depicts example user views of example graphical displays on a device 602. As shown in FIG. 6a, a password entry prompt 604 may request entry of a password or other security string in an entry text box 606. A prediction text box 608 may display real-time predictions 610 of predicted weak password completions, with reasons for the determination of weakness. As an example, a user may have already entered "p@$" as a current input string in the entry text box 606, and may be provided with a real-time display of a prediction list (e.g., in the prediction text box 608) that includes "p@$$word (common password)", "p@$sword (common password)", and "p@$$w0rd (common password with common letter replacement)". Such user feedback may indicate that "$" and "s" are predictable characters and that the user will receive no credit for them in terms of a score for strength of the password, and that the user will receive no credit for any characters that follow in the autofill if he/she continues entering "p@$$w0rd" or some other variant of the predictable string "password".

As shown in FIG. 6b, a user who provides "abc1" in the entry text box 606 may receive a real-time display of "abc123 (common character sequence)" in the prediction text box 608.

As shown in FIG. 6c, a user who provides "qqqq" in the entry text box 606 may receive a real-time display of "qqqqq (repeated character sequence)" in the prediction text box 608.

As shown in FIG. 6d, a user who provides "ladyg" in the entry text box 606 may receive a real-time display of "ladygaga (BING search term)" in the prediction text box 608.

As shown in FIG. 6e, a user who provides "drow" in the entry text box 606 may receive a real-time display of "wordssap (common word "password" spelled backwards)" along with alternatives such as "wordss@p" and "word$$ap" in the prediction text box 608.

According to an example embodiment as shown in FIG. 6f, a user who provides "qqqq" in the entry text box 606 (similar to the example of FIG. 6c) may view "*q" in the entry text box 606 as additional security for blocking display of a string entry in progress. The user may then receive a real-time display of "*123 (common character sequence)" in the prediction text box 608.

One skilled in the art of data processing will understand that there are many other ways to obtain user input, and to provide a real-time display of the predictions to the user, without departing from the spirit of the discussion herein. For example, a predicted next character sequence may be displayed as a concatenated substring to the current string entry, in the same text area as the entered text. For example, alternative predictions may appear as a list adjacent to, or below, the first displayed prediction. For example, the characters may be displayed with colors or shading (or other visual effects such as blinking, or audio effects such as sirens) indicating desirability (e.g., green color) or undesirability (e.g., red color, siren sounding) of each respective character or substring.

Thus, example techniques discussed herein may provide feedback on weak passwords before a user completes entry of the weak character strings. For example, the experience of seeing the user's "clever" password predicted before it is fully entered may provide a sense of visceral user surprise that attracts the user's attention to potential password issues.

According to example embodiments herein, the user may be allowed to enter as many predictable characters as the user desires, but those characters may not count (or may count less) toward satisfaction of a minimum length/security rule of a system that employs passwords or other security strings. For example, an administrator of such a system may justify use of such rules based on an assumption that, if the system is able to predict a significant portion of a user's password, then a potential attacker may also predict the password.

For example, techniques discussed herein may detect weaknesses that may result from (1) common passwords (e.g., "password", "letmein"), (2) dictionary words (e.g., in any language), (3) common terms on the Internet (e.g., BING search terms such as "madonna"), (4) strings forbidden in (1)-(3) that have been modified via common character transforms (e.g., "o"→"0", "e"→"3", "s"→"$", "at"→"@", removing spaces, writing words backwards, etc.), (5) sequences (e.g., "aaaa", "abcabc"), palindromes, etc., and/or (6) characters that are predictable from previous characters (e.g., "q" is followed by "u" in English, with high frequency), identifiable by bigrams, trigrams, or n-grams of common strings.

As further examples, techniques discussed herein may detect weaknesses that may result from repeated characters sequences (e.g., "reprepreprep") or interleavings (e.g., "p*a*s*s*w*o*r*d").

According to an example embodiment, characters deemed as unacceptable may be displayed when the prefix string entered by the user is of zero length (e.g., suggest avoiding the character "!" if many users seem to be starting their passwords with "!" as an initial character).

With regard to onscreen keyboards, example techniques discussed herein may provide sensory feedback to the user based on visual or tactile effects via the onscreen keyboard. For example, keys that are predicted to be the next character may be displayed with a red coloring effect, to discourage the user from typing those characters. Such a visual presentation may also be shown (e.g., via a display) for users of conventional keyboards. As another example, sensory effects such as heat, odor, prickly tactile effects, and other undesirable sensory effects may be used with keyboards (or virtual keyboards) to discourage users from entering next characters that are deemed undesirable.

According to an example embodiment, keyboard keys associated with next undesirable characters may be disabled, or keys may be made harder to press.

According to an example embodiment, a character prediction system may be made available so that experts, users, and others can report passwords believed to be predictable but that were not indicated as such by the password checker. For example, if the password "asdfghjkl" were reported, and the system was not yet making predictions based on the common behavior of choosing passwords by picking keys that form a line on the keyboard, such a heuristic could be added.

According to an example embodiment, the password score determination component 150 may determine the aggregate score 152 indicating a current password strength associated with the first character string 106, based on a sum of predictability values associated with character substrings included in the first character string 106. For example, for a character with a predicted probability p, the score for that character may be determined as $\log_2(1/p)$. For example, a system may predict the next character in a current string to be "f" with probability 50% and "h" with probability 12.5%. For this example, if the user enters "f", the score for that character may be determined as $\log_2(1/0.5)=\log_2(2)=1$. For this example, if the user instead enters "h", the score for that character may be determined as $\log_2(1/0.125)=\log_2(8)=3$.

According to an example embodiment, p may not be allowed to fall lower than a probability of selecting the character, if choosing characters from the alphabet at random. In other words, if there are 64 characters possible, the smallest p would be $1/64$.

According to an example embodiment, the aggregate score 152 may be normalized by dividing by a highest possible score for a character, such that the highest possible score for that character is 1. In other words, $\log_2(1/\min_p)/\log(1/\min_p)=1$. In such a scoring system, the score may thus represent equivalent security to a password of score characters chosen at random from the alphabet.

According to another example embodiment, when the user selects the character that is predicted as most likely, he/she may receive 0 points for doing so.

According to another example embodiment, the user may be awarded more points for entering an unpredictable character if there are common predictions that the user avoids as the string is entered. One skilled in the art of data processing will understand that there are many ways of determining password scores, without departing from the spirit of the discussion herein.

For example, techniques for identifying undesirable passwords are discussed in Stuart Schechter et al., "Popularity is Everything: A New Approach to Protecting Passwords from Statistical-guessing Attacks," *In The 5th USENIX Workshop on Hot Topics in Security* (HotSec '10), USENIX, Aug. 10, 2010.

Customer privacy and confidentiality have been ongoing considerations in data processing environments for many years. Thus, example techniques for predicting completion of weak passwords may use user input and/or data provided by users who have provided permission via one or more subscription agreements (e.g., "Terms of Service" (TOS) agreements) with associated applications or services associated with predicting completion of weak passwords. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality). Implementations may be implemented as a computer program embodied in a propagated signal or, alternatively, as a computer program product that is not a signal, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, a data processing apparatus, e.g., a programmable processor, a computer, or multiple computers. A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   a weak string predictor embodied via executable instructions stored on a machine readable storage device; and
   at least one device processor configured to execute at least a portion of the executable instructions stored on the machine readable storage device, the weak string predictor including:
   a prefix acquisition component configured to obtain a current prefix character string received from a user input device, representing a prefix of a proposed password;
   a prediction generator configured to determine a prediction of a most likely next character of the proposed password based on applying a set of heuristics to the current prefix character string; and
   a response generator configured to determine a response indicating an impact on a security strength of the proposed password, based on a selection of the predicted most likely next character, and to initiate a display of weakness attributes of a plurality of candidate passwords that include the current prefix character string, with the predicted most likely next character as a next character following the current prefix character string, included in each of the plurality of candidate passwords, the weakness attributes stating reasons for weakness of each of the plurality of candidate passwords, the response generator configured to initiate at least partial blocking of input to the user input device that is associated with current input of the predicted most likely next character,
   the response generator further configured to initiate a display of the predicted most likely next character of the proposed password, indicating the impact on the security strength of the proposed password.

2. The system of claim 1, wherein:
   if the current prefix character string has zero length, the prediction generator determines the prediction of the most likely next character of the proposed password, based on a prediction of an initial input character associated with the proposed password, based on a current null prefix character string and applying a set of predictive password heuristics and data associated with initial characters associated with passwords.

3. The system of claim 1, wherein:
the display of the predicted most likely next character includes sensory feedback indicating one or more warnings to a user of one or more weaknesses associated with at least one candidate password that includes the current prefix character string with the most likely next character as the next character following the current prefix character string, included in the candidate password.

4. The system of claim 3, wherein:
the sensory feedback includes one or more of:
coloring of one or more characters included in the candidate password,
underscoring of one or more characters included in the candidate password,
coloring of one or more character input devices associated with entry of selected characters,
shading variations of portions of the candidate password,
flashing of portions of the candidate password,
presentation of a score representing a level of security strength or weakness,
a placement of the predicted most likely next character in a scoring table, or
a placement of the predicted most likely next character appended to the end of the current prefix string.

5. The system of claim 1, wherein:
the response generator is configured to determine the response indicating the impact on the security strength of the proposed password, based on initiating disablement of a portion of the user input device that is associated with current input of the most likely next character.

6. The system of claim 1, wherein:
the prediction generator is configured to determine the prediction of the most likely next character of the proposed password, based on applying the set of heuristics to the current prefix character string, based on analyses of one or more of:
popular passwords,
dictionary words,
popular terms obtained from the Internet,
strings modified via character transforms,
strings that include at least one repeated character sequence,
strings that include at least one interleaved character,
character string sequences,
palindromes, or
a weakness based on n-gram analyses associated with frequently occurring strings of characters.

7. The system of claim 1, wherein:
the prefix acquisition component is configured to obtain a next current prefix character string, based on obtaining at least one next input character from the user input device, after obtaining the current prefix character string,
the prediction generator is configured to determine a next prediction of a most likely next character of the proposed password based on applying the set of heuristics to the next current prefix character string, and
the response generator is configured to determine a next response indicating a next impact on the security strength of the proposed password, based on a selection of the next predicted most likely next character.

8. The system of claim 1, wherein:
the prediction generator is configured to determine the prediction of the most likely next character of the proposed password, based on the current prefix character string and predictive password heuristics, based on analyses of candidate characters that are predictable based on other characters preceding the candidate characters in the current prefix character string, based on n-gram analyses associated with frequently occurring character strings.

9. The system of claim 1, wherein the weak string predictor further includes:
a heuristic update component configured to initiate updates to information associated with the predictive heuristics, based on information associated with determinations of weak password character sequences, obtained via one or more of:
volunteer submissions,
work-for-hire submissions, or
a contest.

10. The system of claim 1, wherein the weak string predictor further includes:
a password score determination component configured to determine an aggregate score indicating a current password strength associated with the current prefix character string, based on a sum of predictability values associated with character substrings included in the current prefix character string.

11. The system of claim 1, wherein:
the prediction generator is configured to determine one or more weakness indicators associated with the predicted most likely next character of the proposed password, and
the response generator is configured to determine the response based on initiating a real-time display, to a user, of the predicted most likely next character of the proposed password and the one or more weakness indicators associated with the predicted most likely next character indicating weakness of the predicted most likely next character.

12. The system of claim 11, wherein:
the one or more weakness indicators include identification of one or more of:
a popular password,
a score indicating a strength of at least a portion of the proposed password, dictionary words,
popular terms obtained from the Internet,
strings modified via character transforms,
strings that include at least one repeated character sequence,
strings that include at least one interleaved character,
character string sequences,
palindromes, or
a weakness based on n-gram analyses associated with frequently occurring strings of characters.

13. A method comprising:
providing a current prefix character string via a user input device, representing a prefix of a proposed password;
obtaining a real-time response indicating respective impacts on a security strength of the proposed password, based on obtaining, via a data processing apparatus, a set of predictions of a most likely next character of the proposed password, based on an application of a set of predictive heuristics to the current prefix character string, and based on predicted selection of respective next input characters from the set of predictions of the most likely next character of the proposed password;
initiating a display of weakness attributes of one or more candidate passwords that include the current prefix character string, with the predicted most likely next character as a next character following the current prefix character string, included in each of the one or more candidate passwords;

initiating at least partial blocking of input to the user input device that is associated with current input of one or more of the predicted most likely next characters; and initiating a display of the predicted most likely next character of the proposed password, indicating the impact on the security strength of the proposed password.

14. The method of claim 13, wherein:

obtaining the set of predictions includes obtaining the set of predictions based on an application of predictive heuristics, based on analyses of one or more of:
popular passwords,
dictionary words,
popular terms obtained from the Internet,
strings modified via character transforms,
strings that include at least one repeated character sequence,
strings that include at least one interleaved character,
character string sequences,
palindromes, or
n-grams associated with frequently occurring character strings.

15. The method of claim 13, further comprising:

initiating updates to information associated with the predictive heuristics, based on information associated with determinations of weak password character sequences, obtained via one or more of:
volunteer submissions,
work-for-hire submissions, or
a contest.

16. The method of claim 13, further comprising:

obtaining an aggregate score indicating a current password strength associated with the current prefix character string, based on a sum of predictability values associated with character substrings included in the current prefix character string.

17. The method of claim 13, wherein:

obtaining the real-time response includes obtaining a real-time display, to a user, of the set of predictions of the most likely next character of the proposed password and respective security strength indicators associated with each respective prediction indicating weakness of the proposed password, if the respective obtained prediction of the most likely next character is included in the proposed password after the current prefix character string.

18. The method of claim 17, wherein:

the real-time display includes a display, to the user, of a null set of predictions of the most likely next character of the proposed password, based on a determination that the current prefix character string is associated with an acceptable password security strength.

19. A computer program product tangibly embodied on a machine readable storage device and including executable code that when executed by a processor causes at least one data processing apparatus to:

obtain a current prefix character string via a user input device, representing a prefix of a proposed password;

determine, via a device processor, a prediction of one or more most likely next characters of the proposed password based on applying a set of predictive heuristics to the current prefix character string;

initiate a real-time display indicating an impact on a security strength of the proposed password, based on a selection of the predicted one or more most likely next characters, the real-time display including displaying, in real-time, a list of password completions that each include a plurality of characters representing completions of passwords that are based on the prediction, as one or more additional characters of the proposed password are obtained via the user input device;

initiate at least partial blocking of input to the user input device that is associated with current input of one or more of the predicted most likely next characters; and initiate a display of the predicted one or more most likely next characters of the proposed password, indicating the impact on the security strength of the proposed password.

20. The computer program product of claim 19, wherein:

the display of the predicted most likely next character includes sensory feedback indicating one or more warnings to a user of one or more weaknesses associated with at least one password completion that includes the current prefix character string with the most likely next character as the next character following the current prefix character string, included in the password completion.

* * * * *